Jan. 25, 1927.　　　　　　　　　　　　　　　　　　　　1,615,505
G. W. W. CORNMAN ET AL
HIGH TEMPERATURE THERMOMETER
Filed June 2, 1922
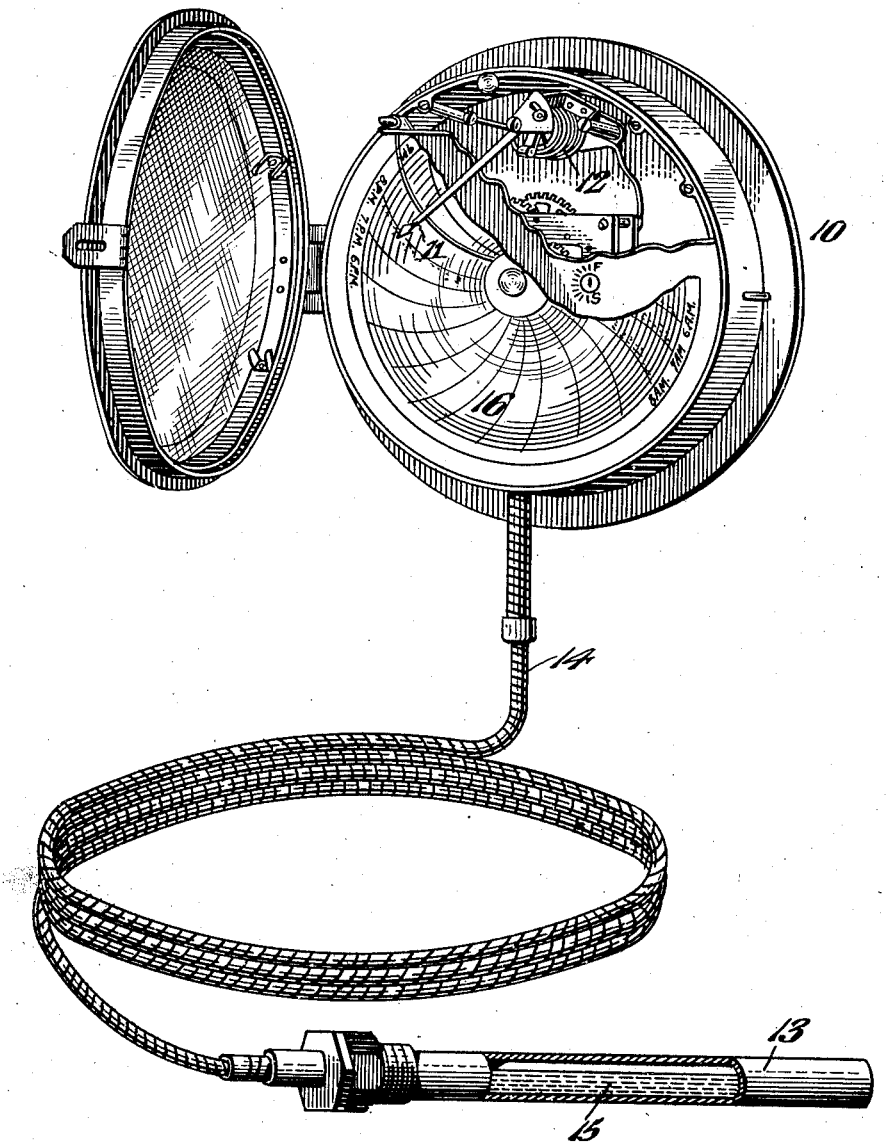
INVENTORS
George W. W. Cornman
and
Richard P. Brown.
By Robert M. Barr.
ATTORNEY Patented Jan. 25, 1927.

1,615,505

UNITED STATES PATENT OFFICE.

GEORGE W. W. CORNMAN AND RICHARD P. BROWN, OF PHILADELPHIA, PENNSYLVANIA, ASSIGNORS TO THE BROWN INSTRUMENT COMPANY, OF PHILADELPHIA, PENNSYLVANIA, A CORPORATION OF PENNSYLVANIA.

HIGH-TEMPERATURE THERMOMETER.

Application filed June 2, 1922. Serial No. 565,296

The present invention relates to temperature responsive devices and indicators, such as thermometers, and more particularly to devices of the vapor-actuated type, in which a body of liquid, suitably confined, is exposed to the temperature to be measured, and the pressure developed as a result of such vaporization as occurs, is utilized, as by means of a Bourdon tube, to actuate a pointer or other index associated with a suitable scale.

Such vapor actuated instruments have proved very valuable as "distance" thermometers in cases where it is desired to read the temperature at some distance from the liquid containing vessel or bulb exposed to the temperature in question, because the pressure developed in the bulb can readily be transmitted considerable distances in a very fine tube, such as a capillary tube connecting the bulb to the pressure responsive device; and also because ordinary variations of temperature to which the connecting tube and the Bourdon tube of the pressure responsive device may be exposed produce no sensible change in the vapor pressure of the liquid therein, and hence do not affect the accuracy of the instrument. This is an advantage in favor of the vapor-actuated type as compared to gas filled thermometers, because the latter operate by the pressure of a permanent gas which, in the Bourdon and connecting tube, is affected in the same way and in the same proportions as that in the bulb for a given variation in temperature. If, therefore, the Bourdon and the connecting tube of a gas actuated instrument happen to be exposed to considerable temperature variation, the reading of the instrument may not always correspond accurately to the temperature of the gas in the bulb.

Heretofore vapor-actuated thermometers have been subject to the limitation that they could not be made to function satisfactorily except under relatively moderate temperatures, not exceeding some 400° F., so that when higher temperatures were to be determined only gas or mercury filled instruments were available.

One of the objects of the present invention is to overcome this vital limitation of the vapor-actuated instruments and to make them fully available and satisfactory for temperatures much in excess of 400° F. By this means the present invention not only provides an instrument more reliable than the gas-actuated one for these high temperatures, but also one more suited and sensitive for the purpose. Thus, while the scale for a gas-actuated thermometer is required to be uniformly graduated throughout,—usually five degree divisions throughout,—the scale for the vapor-actuated thermometer can be unevenly graduated to give more and more space per degree as the temperature increases, and is usually graduated with two degree divisions,—though the divisions are dependent, of course, upon the total scale range. These and other advantages are made possible by the discovery, through the present invention, that certain substances or materials characterized by a high critical temperature and by a boiling point not exceeding moderate limits, preferably toluol, will be found satisfactory and accurate vaporous actuating media for temperatures ranging from the boiling point of such medium, or a little lower, up to and above the critical temperature. With such substances, one and the same vapor-actuated instrument can be made to cover efficiently temperatures ranging to 800° F., and upward.

In the foregoing, toluol has been referred to as the preferred substance or actuating medium because we have discovered that by its use entirely new and distinctive results are obtainable in high temperature thermometer work, and particularly in the distant type of instrument. The boiling point of toluol, as is well known, is 230.5° F. Its critical temperature is higher by about 400° F., i. e., specifically, 608° F. While toluol thus has a relatively high critical temperature, we have found that its changed condition, after the temperature being measured has exceeded the critical temperature, does not interfere with accurate temperature indication by the instrument, not even though the temperature should approximate 1000° F. Also, toluol does not corrode nor otherwise affect the materials usually employed in vapor-actuated instruments, nor give rise to extreme pressure or other dangers.

It will be apparent that toluol or the like is very markedly different from mediums hitherto used or instruments of this character, such as alcohol, ether, water, or sulphur dioxide, since instruments using such media are inherently subject to the limitations above set forth. An instrument constructed in accordance with the present invention operates like a vapor actuated instrument up to the critical temperature of its actuating medium, while at higher temperatures the instrument functions like a gas actuated instrument since at the critical temperature all of the medium is vaporized and passes into gaseous state. The use of toluol as an actuating medium is especially advantageous because of its relatively low boiling point and its relatively high critical temperature, the latter being about 608° F. Toluol is especially advantageous, also, because its transition from the saturated vapor state to the unsaturated gaseous state at the critical temperature is not marked by any abruptness, eccentricities, or irregularities that might make the scale graduation of the instrument in which it is used difficult or uncertain in the critical temperature portion of the scale range.

Among the special advantages of an instrument in which the scale range extends substantially to each side of the critical temperature of the actuating medium, is the great foreshortening of the scale indications of the instrument for the lower temperatures. For instance, when toluol is the medium in such an instrument as is shown in the annexed drawing, the chart distance representing the 450° F. interval or temperature range from 50° F. to 500° F. is less than half that representing the 200° F. interval or range from 500° F. to 700° F. This facilitates the proper reading of the scale indications for the higher temperatures as is ordinarily desirable in an instrument intended for measuring temperatures varying over a wide range. For temperatures above the critical temperature equal temperature differences are represented by substantially identical scale increments or distances.

The use of an actuating medium which, like toluol, has a relatively high critical temperature in accordance with the present invention to measure temperatures above and below said critical temperature, possesses the advantage over an instrument containing a gaseous medium for measuring temperatures over the same range that the errors due to temperature changes in portions of the apparatus remote from the bulb exposed to the temperature to be measured are minimized. This follows from the fact that the percentage errors, due to the ordinary atmospheric temperature variations to which the external parts of the measuring apparatus are subjected, decrease as the temperature measured increases. An instrument constructed in accordance with the present invention for measuring temperatures above and below the critical temperature of the actuating medium is thus inherently and intrinsically more accurate than an instrument in which the actuating medium is in the gaseous state throughout the same temperature range.

In the accompanying drawings, the figure represents a vapor-actuated recording thermometer embodying one form of the present invention, and showing a portion broken away for clearness of illustration.

Referring to the drawings one form of the present invention comprises an indicating instrument 10, here shown as of the long distance temperature recording type, having the usual pen arm or index 11, which is arranged to be actuated by a helical Bourdon tube 12, the unsealed end of which is connected to a bulb 13 by a flexible protectively armored tube 14, the bore of which is preferably of capillary fineness. This bulb 13 is arranged to be located in the heat zone the temperature of which is to be measured or indicated, and in the present instance is partially filled with a liquid 15, as toluol, which has such properties as above set forth. When the bulb 13 is inserted in the zone of heat whose temperature is to be measured, the pressure developed tends to uncurl the Bourdon 12 and thus causes the index 11 to move over the chart 16, which may be graduated and calibrated according to the principles above indicated, i. e., unevenly for temperatures below the critical point of the actuating medium, and evenly for higher temperatures.

While but a single form is shown in which this invention may be embodied, it is to be understood that the invention is not limited to any specific construction, but might be applied in various forms without departing from the spirit of the invention or the scope of the appended claims.

Having thus described our invention, we claim:

1. An expansion thermometer having pressure responsive indicating means for the measurement of temperatures over a predetermined range, and comprising a fluid actuating medium having a critical temperature intermediate the limits of such range.

2. An expansion thermometer having pressure responsive means for the measurement of temperatures over a predetermined range, and comprising a fluid actuating medium having a critical temperature much above ordinary atmospheric temperatures and adapted for measuring temperatures over a range extending above and below said critical temperature.

3. An expansion thermometer having pressure responsive indicating means for the measurement of temperatures over a predetermined range, and comprising toluol as its fluid actuating medium and adapted for measuring temperatures over a range extending above the critical temperature of toluol.

4. An expansion thermometer comprising in combination an indicating instrument including an index and a Bourdon tube for actuating said index, a bulb, a conduit connecting said bulb and tube, and a fluid actuating medium in said bulb, said bulb being adapted to withstand, and said instrument being adapted to indicate the internal pressure variations resulting from, exposure of the bulb to a temperature range extending above and below the critical temperature of said medium.

Signed at Philadelphia, in the county of Philadelphia, and State of Pennsylvania, this 29 day of May, 1922.

GEORGE W. W. CORNMAN.
RICHARD P. BROWN.